May 1, 1934.  E. MARTEL  1,957,018
ELECTRICALLY HEATED STEERING WHEEL
Filed June 14, 1933  2 Sheets-Sheet 1
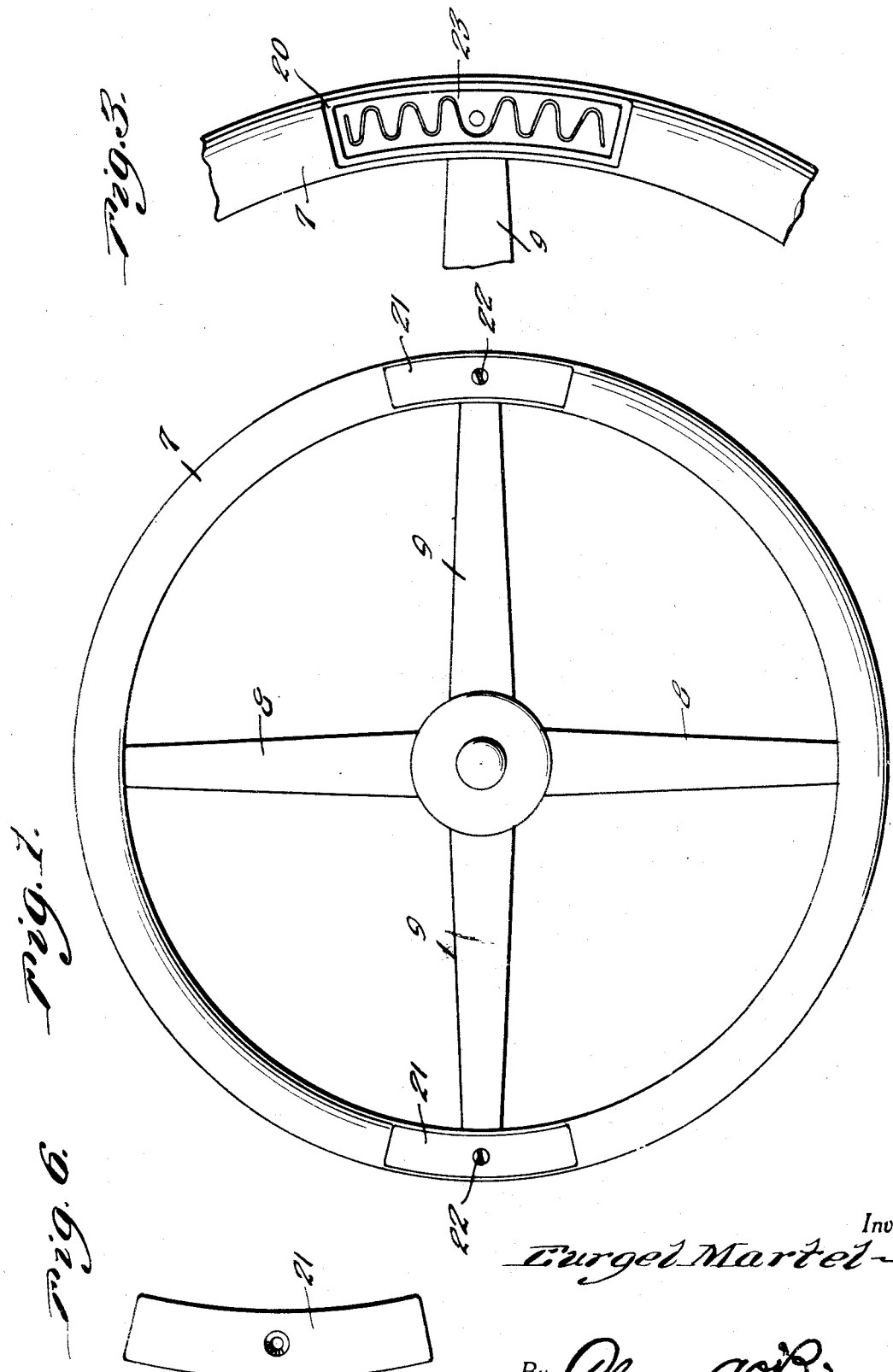

May 1, 1934.  E. MARTEL  1,957,018
ELECTRICALLY HEATED STEERING WHEEL
Filed June 14, 1933  2 Sheets-Sheet 2
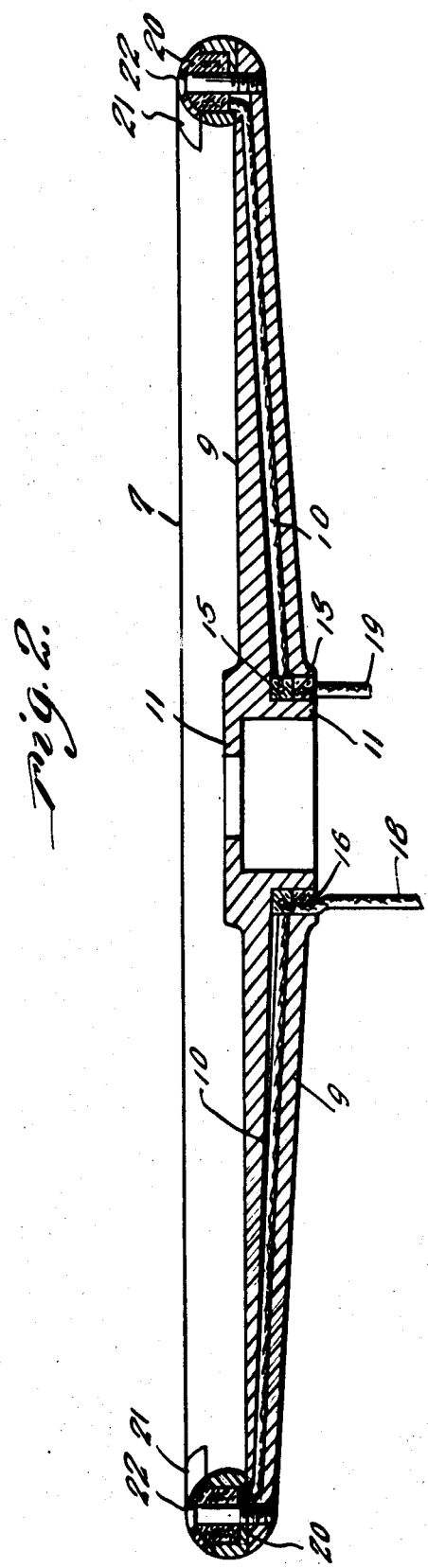
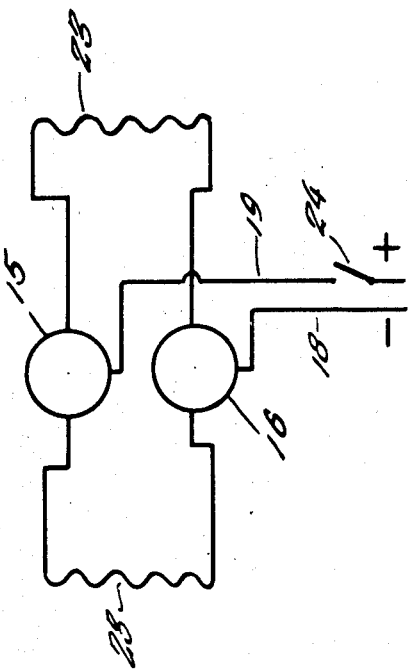
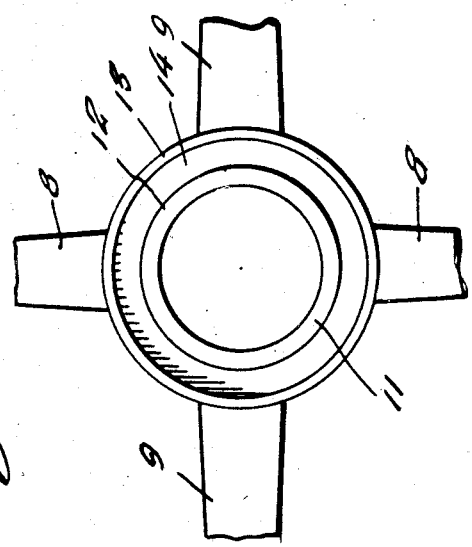
Inventor
Eurgel Martel
By Clarence A. O'Brien
Attorney Patented May 1, 1934

1,957,018

UNITED STATES PATENT OFFICE 1,957,018

ELECTRICALLY HEATED STEERING WHEEL

Eurgel Martel, Cashel, N. Dak.

Application June 14, 1933, Serial No. 675,854

1 Claim. (Cl. 219—19)

This invention relates to a novel and improved electrically heated steering wheel for automobiles and similar motor equipped vehicles.

The purpose of the invention is to provide an especially constructed steering wheel having a hollow heat conducting rim, a pair of diametrically opposed hollow spokes to accommodate current conducting wires, and a pair of simple and economical heating units installed in the rim at conveniently located points in a manner to simplify and minimize expensive manufacture and sale.

Other features and advantages of the invention will become more readily apparent from the following description and drawings.

In the drawings:

Figure 1 is a top plan view of a steering wheel embodying the improvement and structural refinement which serves to distinguish the invention as constructed in accordance with my idea.

Figure 2 is a sectional view detailing the features more explicitly.

Figure 3 is a fragmentary plan view.

Figure 4 is a fragmentary bottom plan view of the central portion of the wheel.

Figure 5 is a view illustrating the wiring diagram.

Figure 6 is a detail plan view of one of the closing plates or caps.

In accordance with my idea the steering wheel is in the form of a single aluminum casting and embodies a hollow annulus or rim 7. The spokes differentiated by the numerals 8 and 9, the two spokes 8 being of solid construction, the spokes 9 formed with bores to accommodate the current conducting cables or wires 10. The numeral 11 designates a cap like hub to fit on the shaft or column in a conventional manner. It will be noted however that in its under side the hub is provided with concentric flanges 12 and 13 which define a retention channel 14 for the contacting inserts or rings 15 and 16 to which the main current supply wire 18 and 19 are electrically connected. This provides a simple and convenient assembly and expedites placement of the wires 10. The numerals 20 designate segmental heating units each of which embodies a casing and a closing cap 21. The cap is held in place by simple fastenings or screws 22. The same fastening serves to attach the heating unit as a whole to the rim 7. Obviously each heating unit embodies a coil 23 of appropriate design contained in the unit as shown in Figure 3 and electrically connected with the current supply wire 10. Incidentally the wiring diagram in Figure 5 illustrates the manner in which the electrical features are coordinated to accomplish the desired result, and in this instance the numeral 24 merely designates a cut out switch of appropriate construction. The gist of the invention is in the provision of a steering wheel formed from a single casting of aluminum or equivalent material embodying the hollow rim 7 with a pair of diametrically opposed electrical heating units embodied therein, together with a plurality of spokes 8 and 9 with the diametrically opposed spokes 9 carrying the current supply wires 10 to facilitate attachment of said wire to the heating unit. It will be noticed that the heating units are relatively small and diametrically arranged at points conveniently located for effective and uniform heating purposes. With this arrangement it is unnecessary to embody expensive heating units in the rim of the wheel since the small units herein shown and described will suffice for effective result. Further novelty is predicated upon the hub construction 11 embodying the concentric flanges 12 and 13 defining a receptacle or groove to accommodate the wire supporting rings 15 and 16. It will thus be seen that the parts have been carefully selected and systematically coordinated to fulfill the requirements of the invention in a simple, economical and practical manner.

A careful consideration of the foregoing description in conjunction with the illustrative drawings will enable the reader to obtain a clear understanding of the purpose, features and advantages, the explicit construction, and the invention as hereinafter claimed.

It is to be understood that minor changes in shape, size, relative proportions, and materials may be resorted to in practice without departing from the spirit of the invention or the scope of the invention as now claimed.

Having thus described my invention, what I claim as new is:

As a new article of manufacture, a steering wheel comprising a single metallic casting embodying an annular rim, a centrally apertured cap like hub for attaching the wheel to the steering column, said hub being formed in its under side with inner and outer concentric flanges defining a retention channel, a plurality of spokes formed integrally with the rim and hub, one diametrically opposed pair of said spokes being provided with wire accommodation bores, the bores communicating at their outer ends with the rim and at their inner ends with said channel, coil equipped electrical heating units of relatively small segmental design fitted in the rim at the outer ends of said bore spokes, current conducting wires extending through the bores, and connected at their outer ends with said heating unit, a pair of superposed rings fitted in said channel, and main current supply wires attached to said rings.

EURGEL MARTEL.